US00RE49211E

(19) United States
(12) Reissued Patent
Cullari et al.

(10) Patent Number: US RE49,211 E
(45) Date of Reissued Patent: Sep. 13, 2022

(54) DECENTRALIZED MULTI-CHANNEL DISCOVERY SYSTEM THROUGH A PLURALITY OF DATA STRUCTURES

(71) Applicant: ZYX Integrated Technologies, Inc., Dripping Springs, TX (US)

(72) Inventors: Dante Carmelo Cullari, Dripping Springs, TX (US); Mark Gregory Valente, Dripping Springs, TX (US)

(73) Assignee: ZYX Integrated Technologies, Inc., Dripping Springs, TX (US)

(21) Appl. No.: 17/324,854

(22) Filed: May 19, 2021

Related U.S. Patent Documents

Reissue of:
(64) Patent No.: 10,958,688
Issued: Mar. 23, 2021
Appl. No.: 15/473,506
Filed: Mar. 29, 2017

(51) Int. Cl.
*H04L 29/06* (2006.01)
*G06F 16/951* (2019.01)
*H04L 9/40* (2022.01)

(52) U.S. Cl.
CPC ..... *H04L 63/20* (2013.01); *G06F 16/951* (2019.01); *H04L 63/102* (2013.01)

(58) Field of Classification Search
CPC ..... H04L 63/20; H04L 63/102; G06F 16/951
See application file for complete search history.

(56) References Cited

U.S. PATENT DOCUMENTS

| | | | | |
|---|---|---|---|---|
| 7,398,364 | B2 * | 7/2008 | Maruyama | G06F 3/0613 707/999.202 |
| 9,977,912 | B1 * | 5/2018 | Kandamuthan | G06F 21/6218 |
| 2013/0290110 | A1 * | 10/2013 | LuVogt | G06F 16/9535 705/14.66 |
| 2015/0335999 | A1 * | 11/2015 | Shimizu | A63F 13/35 463/42 |
| 2016/0342804 | A1 * | 11/2016 | Reddy | G06F 21/6218 |
| 2017/0041296 | A1 * | 2/2017 | Ford | G06F 16/951 |

* cited by examiner

*Primary Examiner* — Adam L Basehoar
(74) *Attorney, Agent, or Firm* — Terrile, Cannatti & Chambers, LLP; Emmanuel A. Rivera

(57) ABSTRACT

Described herein are technologies related to an implementation of a decentralized discovery system that utilizes a plurality of fuse-nodes to facilitate delivery of content specific data to a user. The plurality of fuse-nodes is a proprietary owned database (or modules) that include relationship links to another fuse-node (s), and/or a particular channel, media, and contents, which further include social network-friends and social network activities of the social network-friend, etc.

17 Claims, 7 Drawing Sheets

AMENDED

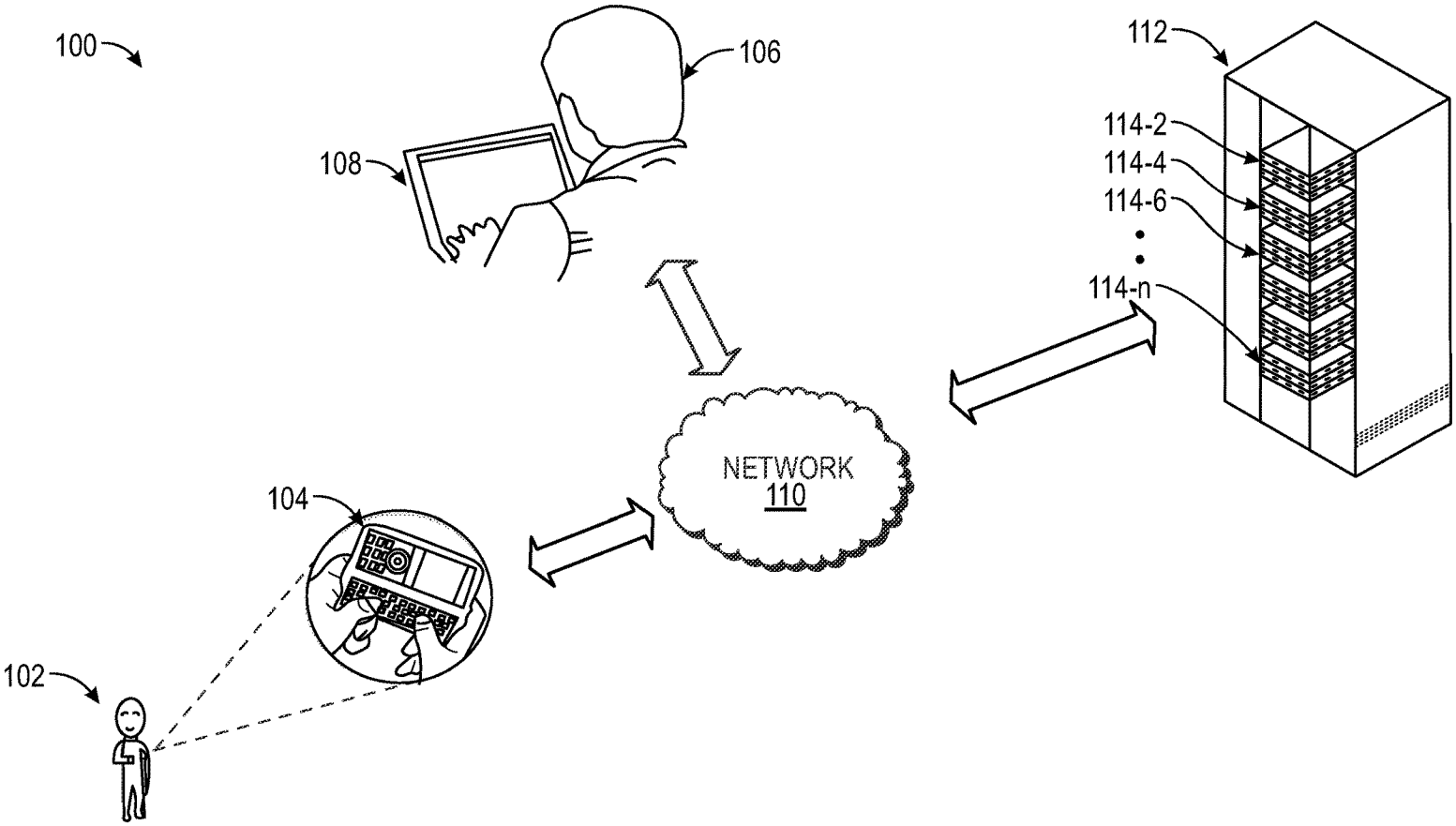
FIG. 1
AMENDED

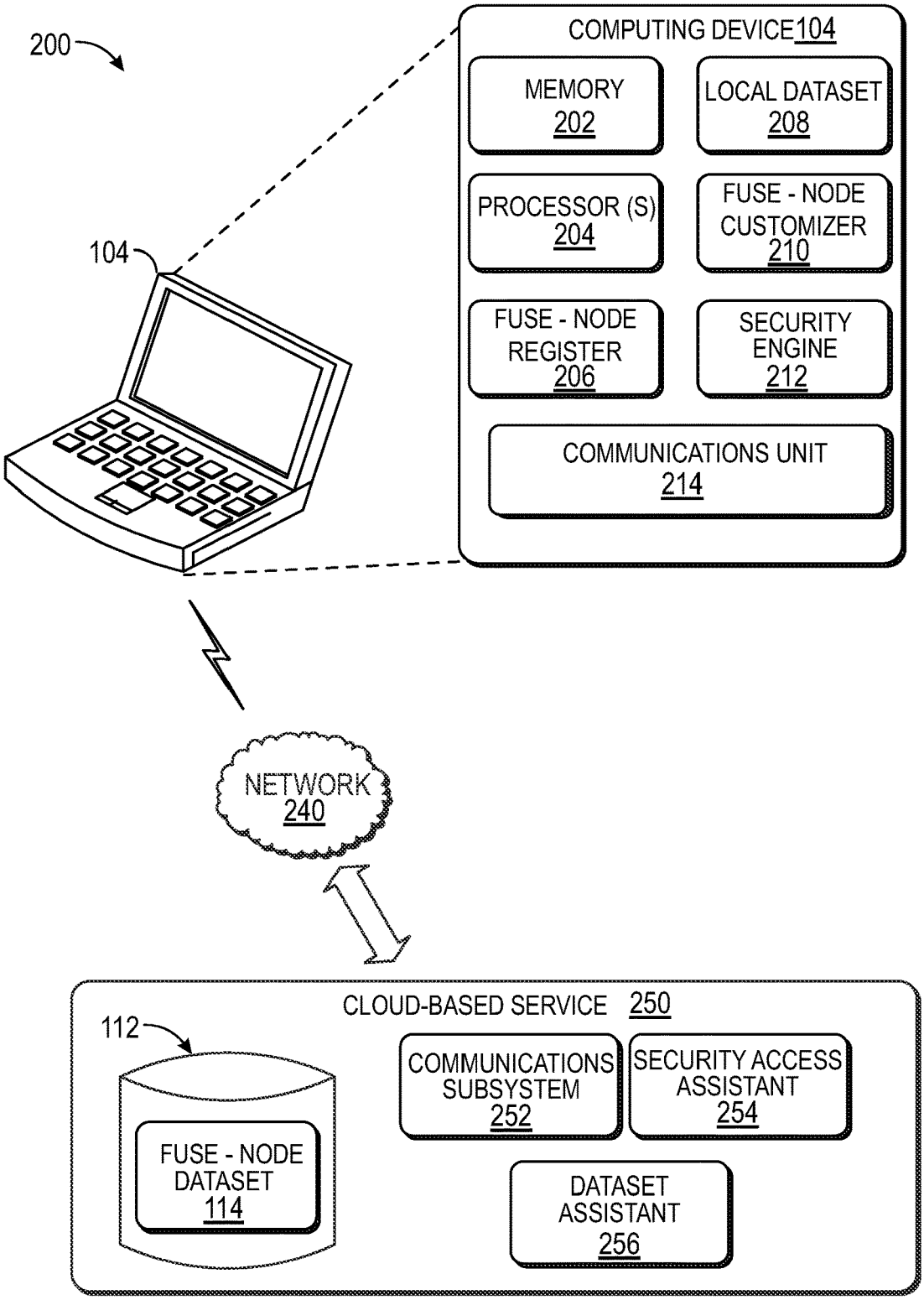
FIG. 2
AMENDED

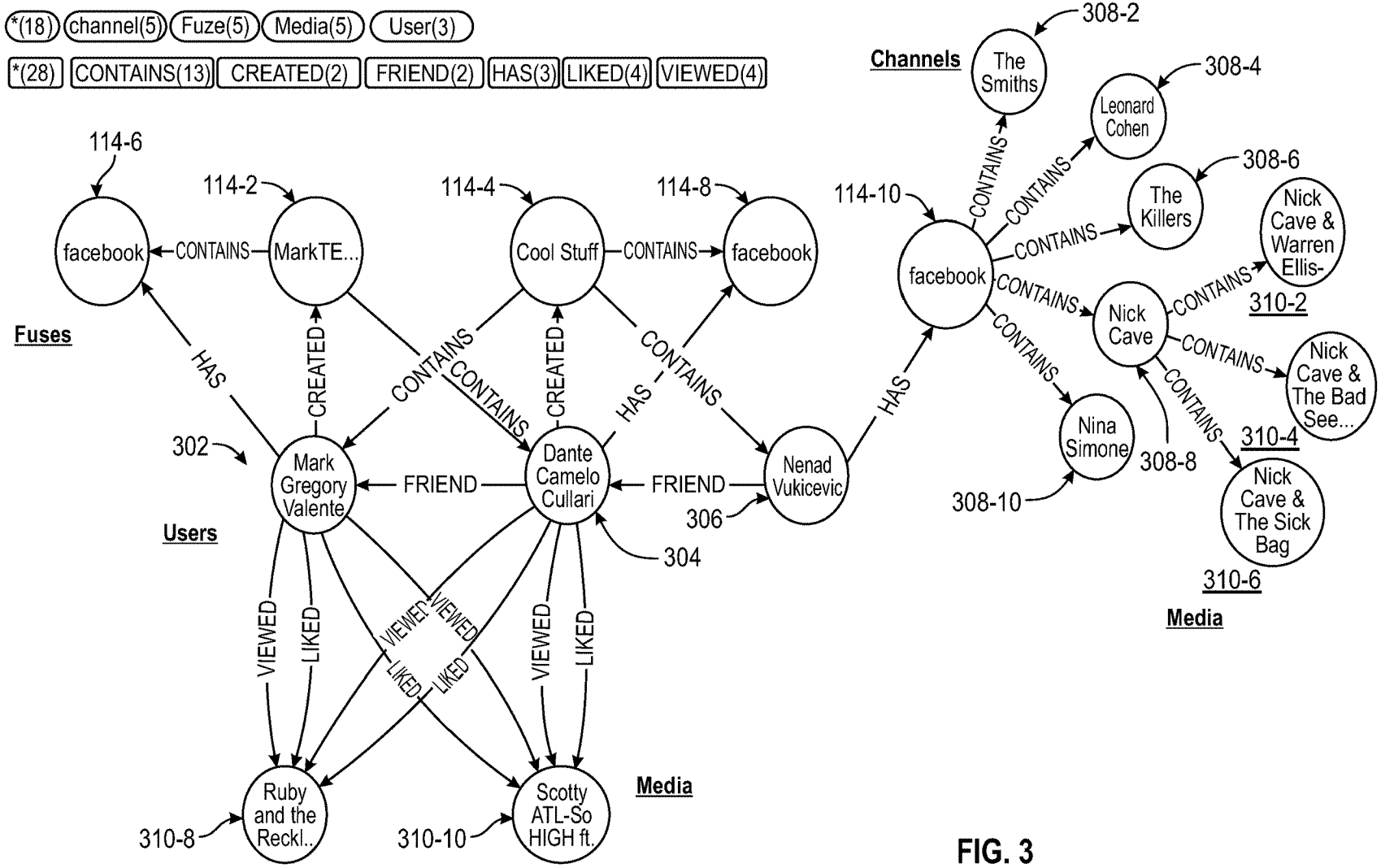
FIG. 3
AMENDED

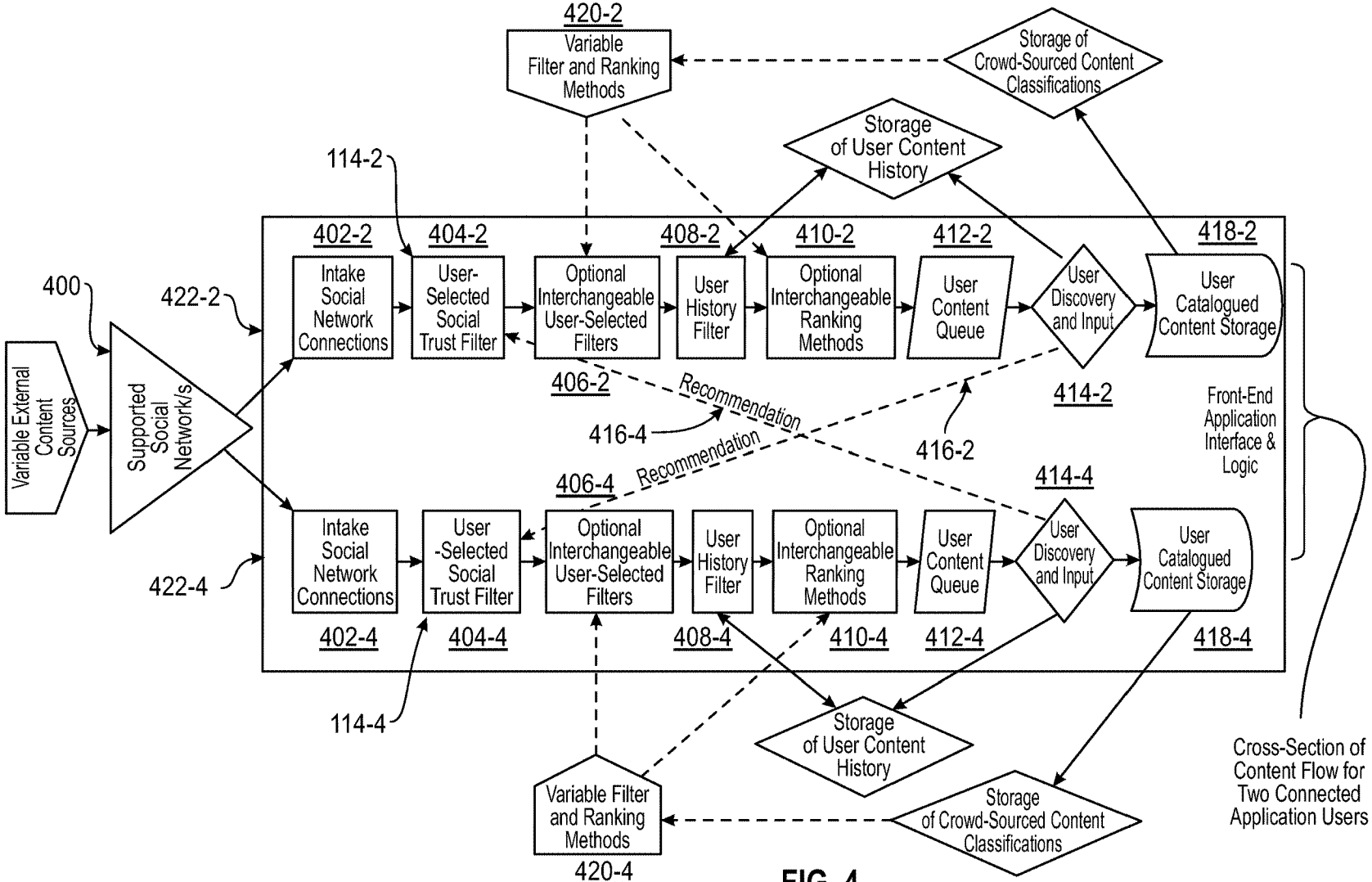
FIG. 4
AMENDED

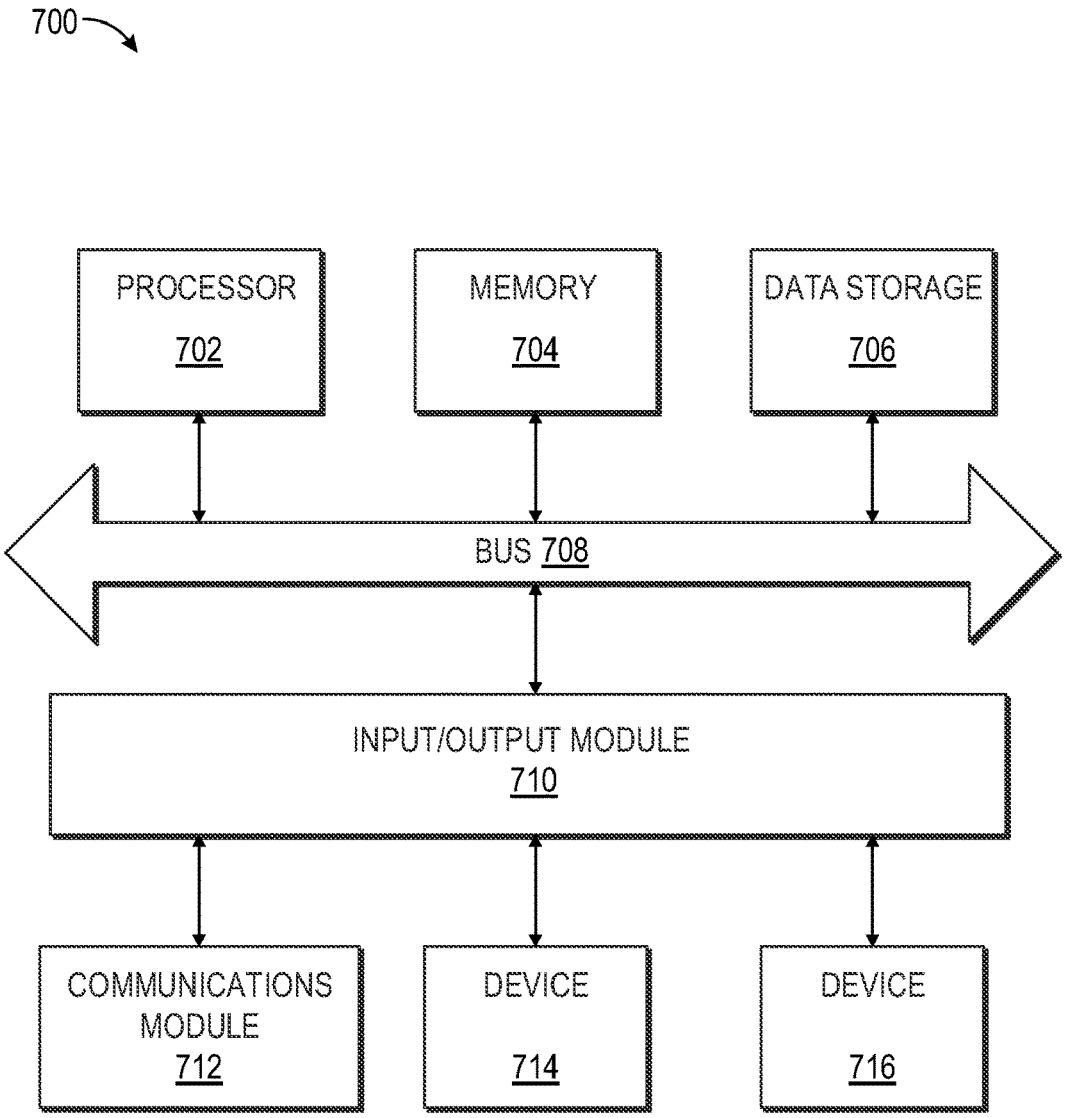
FIG. 7
AMENDED

DECENTRALIZED MULTI-CHANNEL DISCOVERY SYSTEM THROUGH A PLURALITY OF DATA STRUCTURES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

Conducting an Internet search based on a search term may typically generate results that are often unhelpful and unfocused. Particularly, when a term is submitted for Internet search, a large number of Internet locations is scanned and browsed to match the submitted search term. Similarly, a user may generally find many choices and sub-layers for the many choices.

Google is an example of an Internet search engine or a machine learning algorithm that searches locations or destination sites throughout the Internet that may match the term to be searched. The destination sites may be stored in or hosted by Web servers. Using the Google Internet search engine may yield the destination site results; however, the resulting destination sites may not guarantee that they are relevant, desirable, or helpful to the user.

To further narrow searches, the user may navigate numerous destinations before achieving the sought-after objective of the search. This narrowing of searches, however, may be costly, time consuming, and worse, the searching may lead to endless result-navigation on the part of the user.

BRIEF DESCRIPTION OF THE DRAWINGS

FIG. 1 illustrates an example overview of implementing a decentralized consumption system as described herein.

FIG. 2 illustrates an example system for implementing the technology described herein.

FIG. 3 illustrates an example implementation of a decentralized consumption system using a plurality of configured fuse-nodes as described herein.

FIG. 4 illustrates an example block diagram of implementing a fuse-node as described herein.

FIG. 7 illustrates an exemplary computer system that implements the processes and techniques described herein.

DETAILED DESCRIPTION

Figure 5:
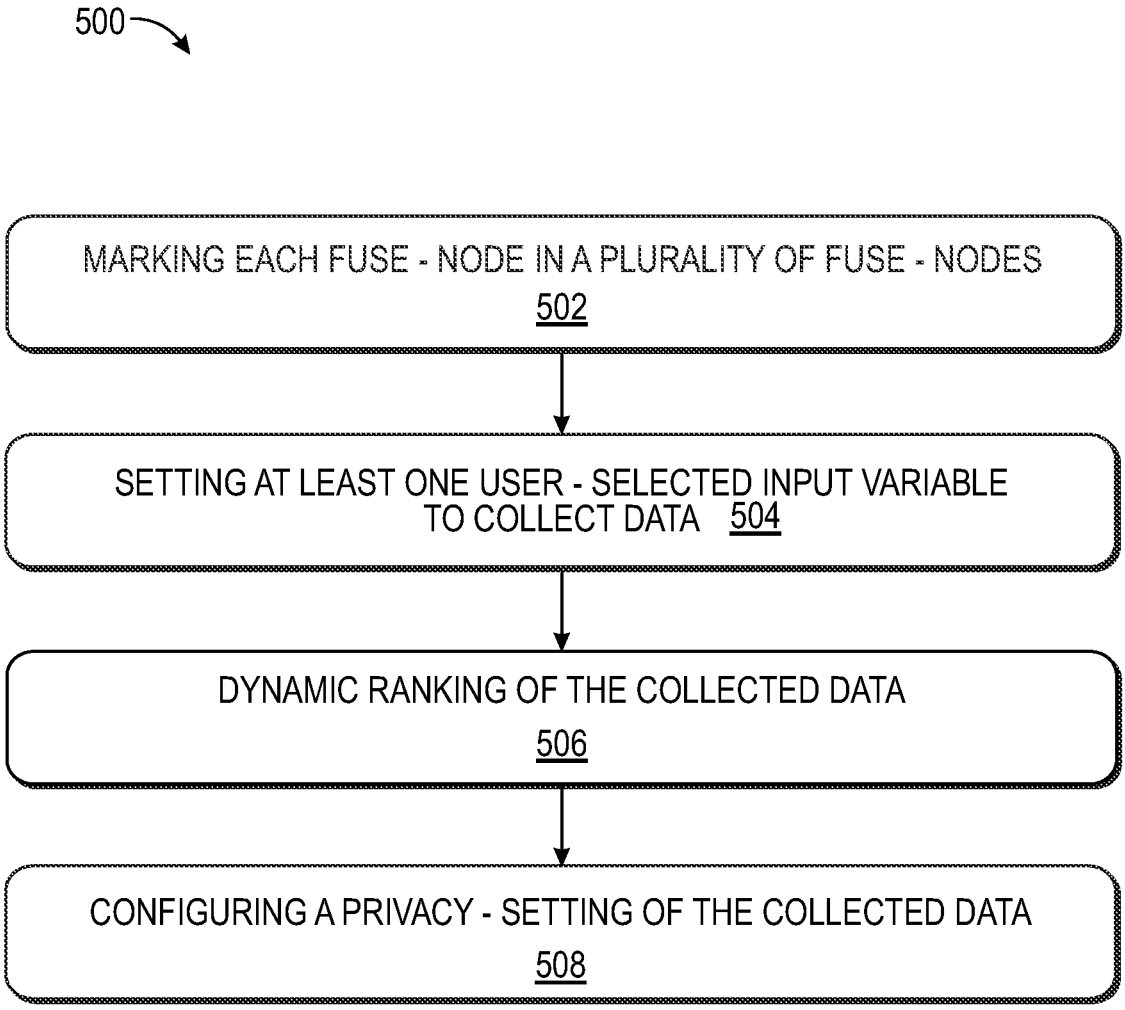
FIG. 5 illustrates an exemplary process for creating a fuse-node that facilitates delivery of content specific data during a search or discovery process as described herein.

Described herein are technologies for implementing a decentralized content consumption system that utilizes a plurality of fuse-nodes to facilitate delivery of content specific data to a user. The plurality of fuse-nodes is a proprietary owned database (or modules) that include relationship-links to an other fuse-nodes, and/or a particular channel, media, and/or contents, which further include social network-friends and social network activities of the social network-friend, etc.

In an embodiment, the plurality of fuse-nodes are first created or initially configured by a user-owner. That is, the initial configuration may include: marking of each of the plurality of fuse-nodes with a corresponding identifier; setting at least one user-selected input variable for a proprietary social recommendation algorithm to filter the collecting of data for each of the plurality of fuse-nodes; ranking the collected data; and configuring a privacy setting of the plurality of fuse-nodes.

After the configuration of the plurality of fuse-nodes, a discovery process or a decentralized content consumption system using the configured plurality of fuse-nodes may be implemented. For example, an access-request from another user may be received to access the created plurality of fuse-nodes. In this example, an access-authorization of the received access-request is determined by the algorithm based on the configured privacy-setting of the plurality of fuse-nodes. Thereafter, the collected data is browsed and selected based on the determined access-authorization. The selected collected data may then be transmitted or supplied to the requesting user.

In an implementation, the collected data for the plurality of fuse-nodes may be updated after a particular time period, or after fulfillment of a condition. For example, the collected data for a particular fuse-node is updated and arranged after each access to the particular fuse-node by the user. In another example, the collected data for the fuse-node may be updated and arranged when a ranked data is accessed a number of times within a specific time duration.

FIG. 1 illustrates an example scenario 100 showing an overview of implementing a decentralized discovery or content consumption system to provide, for example, content specific data to one or more users of fuse-nodes as described herein. Particularly, the content specific data may include filtered data that may be stored through a plurality of fuse-nodes in a database. The plurality of fuse-nodes, for example, may be created through an algorithm, and may be proprietary owned by the one or more users. As opposed to Google Search where the Google searching generally generate results based on key content tags and attributes of the word(s) to be searched, the filtered data that may be generated by the plurality of fuse-nodes may be more specific to user-selected interest, user-selected favorite links, user's selected channels, contents, media, and the like.

Scenario 100 shows a first user 102 with a mobile device 104 (e.g., cellphone, iPad, etc.), a second user 106 with a (laptop) device 108, a network 110, and a database or data structure 112 that stores a plurality of fuse-nodes 114 (or may be interchangeably referred to as modules or fuse-node dataset).

As an overview of the scenario 100, the first user 102, for example, may own proprietary rights over a particular module or fuse-node 114-2. To initially configure the fuse-node 114-2, the user 102 may open an app in the device 104 and the app may execute an algorithm that facilitates collection of data by the fuse-node 114-2. The collected data, for example, may be based upon user selected-filtering input variables for each sub-node in the fuse node 114-2. The collected data is subsequently organized by the algorithm into different categories, ranking, accessibility, levels, and attributes as well. The algorithm may further perform dynamic ranking of the collected data and in addition, the algorithm may configure a privacy setting of the fuse-node 114-2 based upon the user selected-filtering input variables entered by the user 102. As described herein, the collection of the data may utilize a proprietary social recommendation algorithm, meaning the user 102 may configure its own set of user selected-filtering input variables to collect and store the data at the fuse-node 114-2.

After the initial configuration of the fuse-node 114-2, the user 102, through the device app, may utilize the fuse-node 114-2 to search specific contents, media, channels, etc. based upon the collected data. Similarly, another user such as the user 106 may request access to the fuse-node 114 that is owned by the user 102.

The contents, for example, may include products and services related to user's interest as may be pre-defined by the user selected-filtering input variables during the initial configuration of the fuse-node 114-2. In this example, search results for the products and services may have been pre-stored as collected data at the fuse-node 114-2. When the products and services are not pre-stored, the search results may be based from key content tags and attributes that were initially pre-defined during the initial configuration of the fuse-node 114-2.

The media may include user's favorite music channels, artists, videos, human-readable data, converted machine-readable data (i.e., XML), and the like, that may be related to pre-defined user selected-filtering input variables during the initial configuration of the fuse-node 114-2.

The channels may include social networking and other sites such as Facebook, YouTube, Twitter, Amazon, and the like. Unlike Facebook, for example, where a content with most overall "likes" or most number of searches typically pops out on a Facebook feed, the use of the fuse-node 114-2 by the user 102 may show substantially the content that may be related to an individual user's interest, favorites, etc., which ultimately result to more of a direct peer-2-peer communication rather than one-to-many social network communications. Furthermore, there is no time decay when the fuse-node 114-2 is accessed by another user (e.g., user 106) because the activities of the user 102 are stored through the fuse-node 114-2.

Although FIG. 1 shows a limited number of users such as the users 102 and 106, in reality, the network 110 may connect multitudes of users (through their devices) to multiple number of fuse-nodes 114.

The network 110 is a generic label for remote services offered over a computer network (e.g., the Internet) that entrusts a user's data, software, and/or computation. For example, the device 104 connects to the device 108 through the network 110. In this example, the network 110 facilitates wired or wireless form of communications between the user device 104 and the other user-device 108.

FIG. 2 illustrates example system 200 for implementing the technology described herein. The system 200 includes the computing device 104 (such as a laptop computer), a network 240, and cloud-based service 250.

As depicted, the computing device 104 includes a memory 202, one or more processor(s) 204 (or simply a processor), a fuse-node register 206, a local dataset 208, a fuse-node customizer 210, a security engine 212, and a communications unit 214. These functional components may be separate or some combination of hardware units. Alternatively, the components may be implemented, at least in part, in software and thus be stored in the memory 202 and executed by the processors 204.

The fuse-node register 206 may facilitate the initial configuration and subsequent updating of the user proprietary owned fuse-node (e.g., fuse-node 114-2) based upon the user-selected input variables and/or user-selected updating parameters that may have been stored on the fuse-node 114-2. For example, the user 102 opens a device app that runs an algorithm for the initial configuration of the fuse-node 114-2. The initial configuration may include: marking a plurality of fuse-nodes or sub-nodes owned by the user 102 with corresponding identifiers; setting at least one user-selected input variable or user-selected parameters for collecting data by each of the marked/identified sub-nodes or the fuse-node 114-2; ranking of the collected data; and configuring a privacy setting of the marked and/or identified plurality of fuse-node or sub-nodes.

To determine the user-selected updating parameters or user-selected input variables that may have been stored on the fuse node 114-2, the fuse-node register 206 is configured to facilitate downloading of these parameters and user-selected input variables from the cloud-based service 250. Furthermore, the fuse-node register 206 may be configured to determine user history filter, user-selected trust filter, user-catalogued content storage, user-content queue, storage of user content history, collected data history, and the like, as may be requested by the user 102 during the initial configuration. In this regard, the fuse-node register 206 facilitates the requesting and downloading of this information from the cloud-based service 250.

After the initial configuration by the fuse-node register 206, the local dataset 208 may store the downloaded collected data, user history filter, user-selected trust filter, user-catalogued content storage, user-content queue, storage of user content history, and the like, from the cloud-based service 250.

In an embodiment, another user e.g., user 106 may request access to contents of the local dataset 208. In this embodiment, an access-authorization for the access-request is first determined. Furthermore, some of the collected data may be modified or filtered for access based on the access-authorization of the requesting user 106. Any supplied data or data modifications to contents in the local dataset 208, for example, may be communicated and stored to the cloud-based service 250 in order to update the corresponding fuse-node 114-2 for subsequent decentralized discovery process i.e., for a next user accessing and searching the fuse-node 114-2.

The user-selected input variables, for example, may limit recommended data from social networking sites such as Facebook, Twitter, YouTube, Amazon, and Instagram. In this example, the fuse-node 114-2 may collect data that may be limited to updates from friends, a particular channel, media, contents, and the like. The user-selected input variables may further include fulfillment of a condition prior to updating of the fuse-node 114-2. For example, the fuse-node 114-2 retains activities within a particular period of a previous but presently disconnected Facebook-friend. In this example, the fuse-node 114-2 may still be used to view content and other activities by the disconnected Facebook-friend (i.e., no time decay).

Referencing back FIG. 2, the fuse-node customizer 210 may be configured to dynamically arrange categories, rankings, updates, etc. on the collected data based from the configured privacy setting of the proprietary owned fuse-node 114-2. Furthermore, the arranging by the fuse-node customizer 210 may be based upon the user-selected input variables, and the collected data in response to the user-selected input variables.

Without limiting features of the proprietary owned fuse-node 114-2, an example graph representation of dynamically arranged and categorized fuse-node 114-2 is illustrated below

| Sub-nodes | Collected Data | Ranking |
|---|---|---|
| Sub-node 100 | Updates from Facebook friends | 3rd Priority |
| Sub-node 200 | YouTube Videos of XYZ Band | 4th Priority |
| Sub-node 300 | Products/Services from Selected Sellers | 1st Priority |
| Sub-node 400 | Stocks Trending | 2nd Priority |

As shown above, the fuse-node 114-2 may be configured to have plurality of sub-nodes (or nodes) 100-400. The collected data for the sub-node 100, for example, may include updates from Facebook friends and is ranked third with regard to its weight value. Similarly, the sub-node 300 may include products and services from selected sellers and is ranked first in weight value. In these examples, when the user 102 is searching for updates through the fuse-node 114-2, the collected data at sub-node 300 may pop up first at user's device before the sub-node 100. In these examples still, the fuse-node customizer 210 may be configured to dynamically arrange categories, rankings, etc. of the collected data of the sub-nodes based from: the configured privacy setting of the user owned fuse-node 114-2; based from the user-selected input variables; based from recent updates; and the like.

With the configured arrangement of categories, rankings, etc. of the collected data, the fuse-node customizer 210 may communicate the configured arrangement to the cloud-based service 250 for storing or updating of the fuse-node 114-2.

As an example of current implementations herein, the communications unit 214 facilitates transmission of the contents of the local dataset 208 to the cloud-based service 250 and particularly, for storage to the fuse-node dataset 114. Furthermore, the communications unit 214 facilitates transmission of access-request to the cloud-based service 250, and in response to this request, the communications unit 214 similarly facilitates the receiving of the requested data such as, the collected data stored on the fuse-node dataset 114.

The security engine 212 is configured to identify the level of access authorization by the individual who logs in and/or the other user (e.g., user 106) who may want to view activities of the user 102. For example, the collected data from the sub-node 100 may not be available to the requesting user 106. In another example, the requesting user 106 is authorized to access the collected data of sub-node 400 and to this end, the security engine 212 is configured to facilitate the access to collected data of sub-node 400 by the requesting user 106.

As an example of present implementations herein, the security engine 212 is configured to generate the collected data based, for example, upon the downloaded data stored in the local dataset 208. Furthermore, the security engine is configured to encrypt the generated data that the requesting user will receive. That is, after the security engine 212 identifies the level of access authorization by the requesting user, the requested data are encoded in order to avoid eavesdroppers or hackers. For example, the requesting user will receive the report using additional password that allows the requesting user to view the report for a certain number of times.

Although not shown, the computing device 104 also includes a graphics subsystem, an audio subsystem, and a user input subsystem. The graphics subsystem is designed to display, in a user-interface, the selected set of fuse-node configurations. The user input subsystem is designed to receive input from the end users who view content filtered by the fuse-node configuration and logs that activity to the cloud-based service 250.

The network 240 may be a wired and/or wireless network. It may include the Internet infrastructure and it may be presented as the so-called "cloud." The network 240 may include wired or wireless local area network, a cellular network, and/or the like. The network 240 links the computing device 104 with one or more network servers or cloud-based service 250.

The cloud-based service 250 includes a communications subsystem 252, a security access assistant 254, a dataset assistant 256, the fuse-node dataset 114, and the database 112. The cloud-based service 250 need not be part of the so-called "cloud." Rather, it may be described as one or more network servers or more simply as a computing system.

The communications subsystem 252 facilitates receiving of data requests and/or updates to the fuse-node dataset 114. For example, any modifications to contents of the local dataset 208 are stored to corresponding fuse-node dataset 114 in the cloud-based service 250. While only one computing device (which is computing device 104) is shown in FIG. 2, in reality the communications subsystem 252 receives multitude of data updates and/or requests, for example, from different users. These data updates may correspond to different fuse-node datasets 114 in the database 112.

The security access assistant 254 determines the authenticity of data updates and/or requests so that the contents of the fuse-node dataset 114 will not be compromised or exposed to malicious software. For example, the security access 254 authenticates the authorization level that is given to the requesting user by the computing device 104. In this example, the data updates and/or data requests will not compromise the contents of the fuse-node dataset 114. Although a single fuse-node dataset 114 is shown in FIG. 2, multitudes of fuse-node dataset 114 are required for multiple users that utilizes the decentralized discovery procedure as described herein.

The dataset assistant 256 responds to requests from the computing devices to access contents of a particular fuse-node dataset 114.

FIG. 3 illustrates an example implementation of a decentralized consumption system using a plurality of configured fuse-nodes as described herein. The configured plurality of fuse-nodes includes relationship links to particular channels, media, and contents, etc. The relationship links, for example, may denote different arrays of relevance for the owner (e.g., user 102) of the plurality of fuse-nodes as related to the channels, media, contents, etc. that are contained and linked-to within a particular fuse-node. Furthermore, the relationship links and their denotations of relevance between the owner and the channels, media and contents may be used to initiate a discovery process for the owner using the fuse-node configuration as a filter for various content, media, products and services that the owner may be likely to consume. Furthermore still, various fuse-node configurations and denotations of relevance may be created for different categories of subjects, channels, media and content, etc., creating a plurality of fuse-node configurations of stored relationships to certain subjects and related media, content, channels, friends, etc.

For example, as shown in FIG. 3, users 302 and 304 created fuse-nodes 114-2 and 114-4, respectively. Furthermore, the users 302 and 304 previously configured or presently owns other fuse-nodes as well such as fuse-nodes 114-6 and 114-8, respectively. Another user 306 may own fuse-node 114-10, which includes channels 308 and media 310-2 to 310-6. FIG. 3 further shows the users 302 and 304 to be connected (e.g., Facebook "friend") together and have viewed and/or liked media 310-8 and 310-10.

As described herein, the plurality of fuse-nodes 114-2 to 114-10 may provide content specific content data to the users 302-306. For example, the user 302 may have previously viewed and/or liked the media content 310-8. In this example, the viewing and liking of the media content 310-8 may be stored at either the fuse-nodes 114-2 or 114-6, which are proprietary owned by the user 302.

On the other hand, the user 304 may configure the fuse-node 114-4 or 114-8 to request access on stored data at the fuse-nodes owned by the user 302 and in response to approved request (or authorization) by the user 302, the user 304 may utilize the fuse-node 114-4 or 114-8 to access and view the actions of the user 302 with regard to the media 310-8. In this regard, the relationship link when the user 304 accesses the actions of the user 302 with regard to the media 310-8 results to more of a peer-to-peer relationship search rather than one-to-may social network site search results.

FIG. 3 further shows relationships between the fuse-nodes 114 and as described herein, the viewing of the channels 308 and/or the media 310 may depend upon the configuration of each fuse-node 114.

FIG. 4 illustrates an example block diagram of implementing a fuse-node as described herein. For example, FIG. 4 illustrates a parallel implementation of two fuse-nodes 114-2 and 114-4 during the decentralized discovery as described herein. In this example, each of the two fuse-nodes 114-2 and 114-4 is presumed to be owned by different users.

As shown, the fuse-node 114-2 may support a social network 400 such as, for example, Facebook. Accordingly, in this example, an intake social network connection 402-2 may be configured to receive data from the social network 400; a user-selected social trust filter 404-2 may be preconfigured by the user (e.g., user 302) for screening data related to user's interest, likes, etc. of the received data from the social network 400; an optional interchangeable user-selected filter 406-2 may be pre-configured by the user 302 for further filtering of data received from the user-selected trust filter 404-2; a user history filter 408-2 may be used by the algorithm as basis for ranking collected and filtered data; an optional interchangeable ranking method 10-2 may be configured as basis for dynamic ranking of data as described in FIG. 2 above; a user content queue 412-2 may be configured to arrange ranking of collected data; and a user-discovery/input 414-2 may be configured to supply a recommendation 416-2 to the fuse-node 114-4, which is owned and operated by another user (e.g., user 304). Furthermore, FIG. 2 shows content storage 418-2 that may supply crowd-sourced content classification to variable filter and ranking method 420-2 and fed back to the optional interchangeable user-selected filter 406-2.

As described herein, the recommendation 416-2 may depend upon level of access-authorization of the fuse-node 114-4.

With regard to operations of the fuse-node 114-4, the steps described above may similarly apply. That is, the fuse-node 114-2 may support the social network 400 such as, for example, Facebook. Accordingly, in this example, an intake social network connection 402-4 may be configured to receive data from the social network 400; a user-selected social trust filter 404-4 may be pre-configured by the user (e.g., user 304) for screening data related to user's interest, likes, etc. of the received data from the social network 400; an optional interchangeable user-selected filter 406-4 may be pre-configured by the user 304 for further filtering of data received from the user-selected trust filter 404-2; etc.

FIG. 5 shows an example process flowchart 500 illustrating an example method for creating a plurality of fuse-nodes that facilitates delivery of specific content data during a search or discovery process. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502, marking each of a plurality of fuse-nodes with a corresponding identifier is performed. For example, the plurality of fuse-nodes is created and identified by corresponding identifiers such as fuse-nodes 114-2, 114-4, etc. In another example, each fuse-node may include sub-nodes marked as sub-nodes 100, 200, etc. In these examples, a user (e.g., user 102) may exercise proprietary rights over at least one (e.g., fuse node 114-2) of the created plurality of fuse-nodes 114. Furthermore, the fuse-node register 206 may facilitate the marking may of each fuse-node 114, which may form a hosted database (e.g., fuse-node dataset 114) that may be accessible, for example, through a network connection (e.g., network 110). The accessibility of the fuse-node dataset 114, however, may depend upon a verified access-authorization of a requesting user or device.

At block 504, setting at least one user-selected input variable for an algorithm to collect data for the created fuse-node is performed. For example, the fuse-node register 206 may be configured to receive at least one user or channel-selected input variable that may define the collecting of data for the fuse-node dataset 114. In this example, the algorithm that may control flow of data into the fuse-node dataset 114.

For example, one of plurality of user-selected input variables includes a particular user-selected social trust filter setting that accepts and/or filters recommendations from particular group members of a social network site such as Facebook. The particular group members, in this example, may be a user-selected close friends who share the same interest in uploading classical music. In this regard, when the user 102 performs a classical music search through the fuse-node 114-2, for example, the user-selected social trust filter may generate results from user-selected Facebook friends or channels.

In another example, the user-selected input variable may include link(s) of a user's social networking site, activities performed by the user 102 on the social networking site, activities of user's social network-friend(s) on the social networking site, fuse-nodes created by the user's social network-friend(s), contents of other fuse-nodes previously created by the user, and the like.

At block 506, dynamic ranking of the collected data is performed. For example, during the initial configuration of the fuse-nodes 114, the fuse-node register 206 is configured to perform the algorithm that defines a corresponding weight value for each collected data stored in the local dataset 208 or the fuse-node dataset 114. In this example, the corresponding weight value may be different for contents, channels, and fuse-nodes.

As an embodiment, the algorithm may define a certain weight value to data stored in the sub-node of the fuse-node 114. In this embodiment, the certain weight value may further qualify contents, channels, and other data of the sub-node. Furthermore, the fuse-node customizer 210 may be configured to dynamically arrange collected data stored in the local dataset 208 based upon ranking, updates, and categories, or completely randomly using a randomizer algorithm.

At block 508, configuring a privacy setting of the created fuse-node is performed. For example, after the ranking of the collected data in block 506, the plurality of sub-nodes (or fuse-nodes) are configured to have a particular privacy setting such as, but not limited to, the time, mode, or manner that collected data will be available to another fuse-node, another user, another website, social networking site, and the like.

Figure 6:
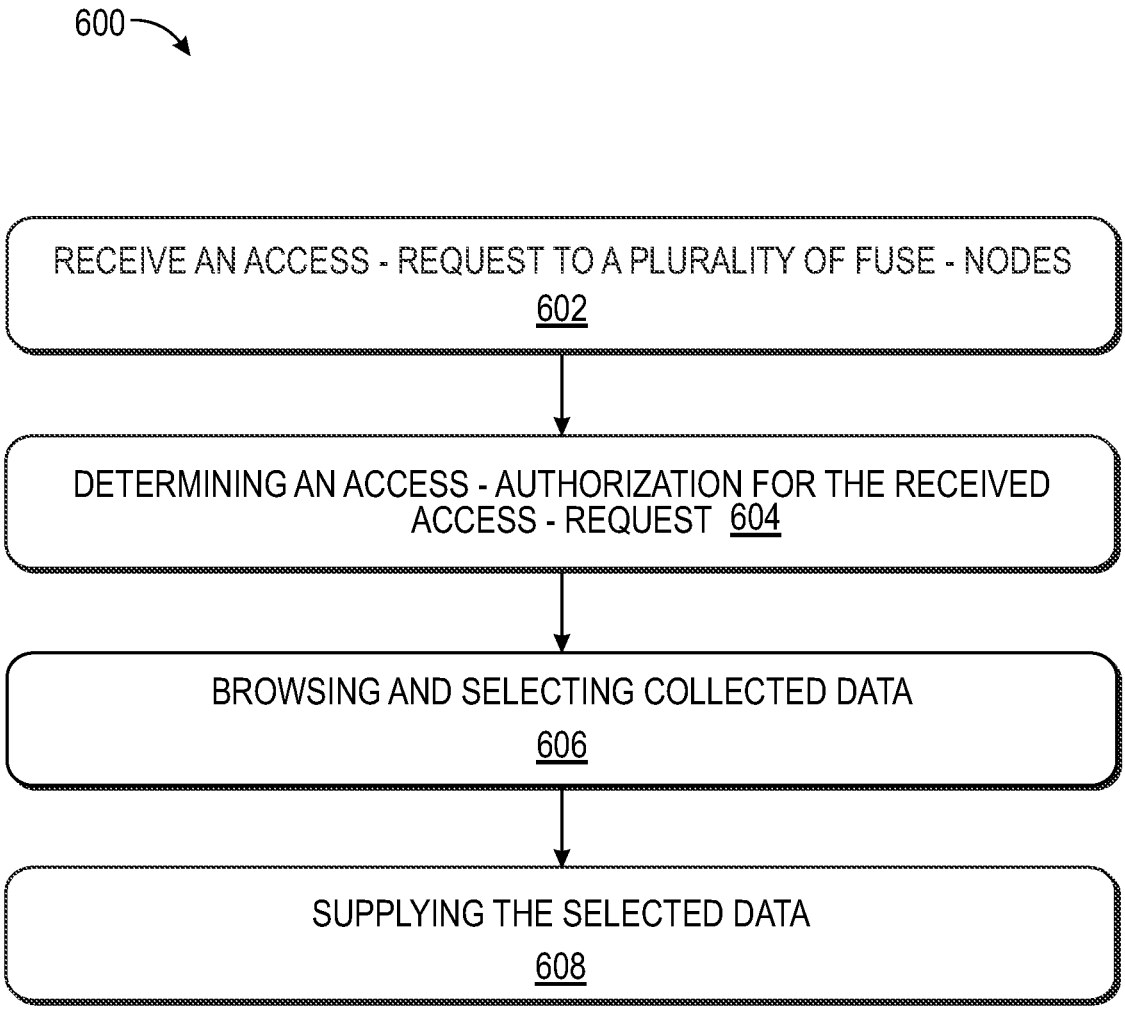
FIG. 6 illustrates an exemplary process for selection and retrieval of data in a plurality of created fuse-nodes as described herein.

FIG. 6 shows an example process flowchart 600 illustrating an example method for selection and retrieval of data from a plurality of created sub-nodes or fuse-nodes. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 602, receiving an access-request to at least one of a plurality of created fuse-node is performed. For example, the request is coming from a social network site such as Facebook or Twitter. In this example, the request is coming from a social network-friend (e.g., user 106) of the user/owner (e.g., user 102) of the created fuse-node 114-2.

At block 604, determining an access-authorization of the received access-request is performed. For example, the sub-node 100 of the fuse-node 114-2 may be accessed only by Facebook "friends" of the user 102. In this example, other sub-nodes of the fuse-node 114-2 are not accessible to the Facebook "friends" of the user 102. Accordingly, the security engine 212 may be configured to identify the level of access authorization by the other user (e.g., user 106) who may want to access the sub-node 100.

At block 606, browsing and selecting collected data of the plurality of fuse-nodes based on the determined access-authorization is performed. For example, the requesting user is authorized to access sub-node 100 in the example above. Furthermore, the requesting user is interested in accessing latest data from the sub-node 100. In this regard, the stored data from the local dataset 208 is browsed and selected based on the determined access-authorization of the requesting user.

At block 608, supplying the browsed collected data is performed. For example, the updates at sub-node 100 of the fuse-node 114-2 is supplied as collected data to the requesting user.

The approaches and systems described herein may be deployed in part or in whole through a machine that executes computer software, program codes, and/or instructions on one or more processors contained in the client devices and/or the server or servers associated with the web-based storage system.

Implementations of the disclosure may include a method on a machine, a system or apparatus as part of or in relation to the machine, or a computer program product embodied in a computer readable medium executing on one or more of the machines. The one or more processors may be part of a server, client, network infrastructure, mobile computing platform, stationary computing platform, or other computing platform.

A processor may be any kind of computational or processing device capable of executing program instructions, codes, binary instructions and the like. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

FIG. 7 is a block diagram illustrating an exemplary computer system 700 with which the decentralized discovery system through a plurality of fuse-nodes of FIG. 1 may implement the scenario of implementing call to action modules of FIG. 2 and the process of FIGS. 5-6. In certain aspects, the computer system 700 may be implemented using hardware or a combination of software and hardware, either in a dedicated server, or integrated into another entity, or distributed across multiple entities.

Computer system 700 includes a bus 708 or other communication mechanism for communicating information, and a processor 702 coupled with bus 708 for processing information. By way of example, the computer system 700 may be implemented with one or more processors 702.

Computer system 700 can include, in addition to hardware, code that creates an execution environment for the computer program in question, e.g., code that constitutes processor firmware, a protocol stack, a database management system, an operating system, or a combination of one or more of them stored in an included memory 704, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, logic circuitry.

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more location without deviating from the scope of the disclosed subject matter. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The computer software, program codes, and/or instructions may be stored and/or accessed on machine readable media that may include: computer components, devices, and recording media that retain digital data used for computing for some interval of time; semiconductor storage known as random access memory (RANI); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RANI disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The elements described and depicted herein, including in flow charts and block diagrams throughout the figures, imply logical boundaries between the elements. However, according to software or hardware engineering practices, the depicted elements and the functions thereof may be implemented on machines through non-transitory computer executable media having a processor capable of executing program instructions stored thereon as a monolithic software structure, as standalone software modules, or as modules that employ external routines, code, services, and so forth, or any combination of these, and all such implementations may be within the scope of the present disclosure.

Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various techniques identified and described above may be varied, and that the order of techniques may be adapted to particular applications of the techniques disclosed herein. All such variations and modifications are intended to fall within the scope of this disclosure. As such, the depiction and/or description of an order for various techniques should not be understood to require a particular order of execution for those techniques, unless required by a particular application, or explicitly stated or otherwise clear from the context.

The methods and/or processes described above, and techniques thereof, may be realized in hardware, or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The instructions may be stored in the memory 704 and implemented in one or more computer program products, i.e., one or more modules of computer program instructions encoded on a computer readable medium for execution by, or to control the operation of, the service 100, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python).

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via an input/output module 710 to various devices. The input/output module 710 can be any input/output module. Example input/output modules 710 include data ports such as USB ports. The input/output module 710 is configured to connect to a communications module 712. Example communications modules 712 include networking interface cards, such as Ethernet cards and modems. In certain aspects, the input/output module 710 is configured to connect to a plurality of devices, such as an input device 714 and/or an output device 716. Example input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 716 include display devices, such as a CRT (cathode ray tube) or LCD (liquid crystal display) monitor, for displaying information to the user.

According to one aspect of the present disclosure, the system for associating a file type with an application as shown in FIGS. 1-2, can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in main memory 704 causes processor 702 to perform the processes described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication networks can include, but are not limited to, for example, any one or more of the following network topologies, including a bus network, a star network, a ring network, a mesh network, a star-bus network, tree or hierarchical network, or the like. The communications modules can be, for example, modems or Ethernet cards.

As discussed above, computing system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, an enterprise server or group of servers, one or more desktop computers, one or more laptop computers, etc. Computer system 700 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

In the claims appended herein, the inventors invoke 35 U.S.C. § 112, paragraph 6 only when the words "means for" or "steps for" are used in the claim. If such words are not used in a claim, then the inventors do not intend for the claim to be construed to cover the corresponding structure, material, or acts described herein (and equivalents thereof) in accordance with 35 U.S.C. § 112, para. 6.

What is claimed is:

1. A method implemented on one or more computing devices to populate a database comprising:

initially configuring a plurality of fuse-nodes by a customizer that receives input variables and arranges one or more of categories, rankings, updates as to collected data from fuse-nodes, wherein a fuse-node includes relationship links to particular channels, media, and content, and denote different arrays of relevance to a user, wherein the initially configuring includes: marking each of the plurality of fuse-nodes with a corresponding identifier;

setting at least one user-selected input variable, or content source, for a proprietary social recommendation algorithm to receive from and filter data for each of the plurality of fuse-nodes, wherein the algorithm is directed to a discovery process that is a request to show content from a collection of sources that are organized by [fuse node] *fuse-node*;

ranking the collected data;

configuring a privacy setting of the plurality of [fuse nodes] *fuse-nodes*, wherein the privacy setting includes a different permission model for each of the plurality of fuse-nodes; and forming a user-selected trust filter;

storing the collected data based upon the initial configuration of the plurality of fuse-nodes;

receiving an access-request to a plurality of fuse-nodes;

determining an access-authorization of the received access-request based on a configured [privacy-setting] *privacy setting* of the plurality of fuse-nodes, wherein the access-request is received from a social networking site, and determining access level authorization of a requesting user;

selecting collected data of the plurality of fuse-nodes based on the determined access-authorization; and supplying and encrypting the selected collected data to the requesting user.

2. The method of claim 1, wherein each [data structure] *fuse-node* in the plurality of fuse-nodes is a proprietary owned database, wherein the fuse-nodes include links to other fuse-nodes, channels, media, and contents, which further include social network-friends and social network activities of the social network-friends.

3. The method of claim 1, wherein the algorithm uses the user-selected [social] trust filter that limits recommended data from a social networking site, which is selected from a group of social media sources.

4. The method of claim 1, wherein the ranking of the collected data includes an assignment of a corresponding weight value to a sub-node, a channel, or a content of each of the plurality of fuse-nodes.

5. The method of claim 1, wherein the algorithm dynamically updates ranking of the collected data based on a user-selected time period.

6. The method of claim 1, wherein the algorithm dynamically [updating of] *updates* the collected data based on a fulfilment of a condition.

7. A computing device comprising:

one or more processors; and memory accessed by the one or more processors, the memory further comprises:

a fuse-node register configured to facilitate initial configuration of a plurality of fuse-nodes, wherein the initial configuration is by a customizer that receives input variables and arranges one or more of categories, rankings, updates as to collected data from fuse-nodes wherein a fuse-node includes relationship links to particular channels, media, and content, and denote different arrays of relevance to a user, wherein the computing device receives an access request to the plurality of fuse-nodes, wherein access request is received from a social networking site, determination is made as to the received access-request based on a configured [privacy-setting] *privacy setting* that includes a different permission model for each of the plurality of fuse-nodes and access level authorization of the user; selection is made as to collected data of the plurality of fuse-nodes based on the determined access-authorization, and supplying and encrypting the collected data to the user; and supplying the selected collected data to a requesting user;

wherein the plurality of *fuse*-nodes [is] *are* created by a local dataset that stores collected data based upon the initial configuration of the plurality of fuse-nodes; and a fuse-node customizer configured to arrange the stored collected data, wherein the initial configuration [comprise] *comprises*:

marking each of the plurality of fuse-nodes with a corresponding identifier;

setting at least one user-selected input variable for a proprietary social recommendation algorithm to receive from and filter data for each of the plurality of fuse-nodes, wherein the algorithm is directed to a discovery process that is a request to show content from a collection of sources that are organized by [fuse node] *fuse-node*; and configuring the privacy setting of the plurality of fuse-nodes.

8. The computing device of claim 7, wherein each fuse-node in the plurality of fuse-nodes is a proprietary owned database that include links to other fuse-nodes, channels, media, and contents, which further include social network-friends and social network activities of the social network-friends.

9. The computing device of claim 7, wherein the initial configuration further comprises:

ranking the collected data.

10. The computing device of claim 7, wherein the algorithm uses a user-selected social trust filter that limits recommended data from a social networking site, which is selected from a group of social media sources.

11. The computing device of claim [7] *9*, wherein the ranking of the collected data includes an assignment of a corresponding weight value to a channel and a content of each of the plurality of fuse-nodes.

12. The computing device of claim 7, wherein the fuse-node customizer is further configured to dynamically update ranking of the collected data based on a user-selected time period.

13. The computing device of claim 7, wherein the algorithm updates ranking of the collected data based on a fulfilment of a condition.

14. A non-transitory computer readable medium that comprises program instructions that causes a computer to perform the method comprising:

initially configuring a plurality of fuse-nodes by a customizer that receives input variables that arranges one or more of categories, rankings, updates as to collected data from fuse-nodes, wherein a fuse-node includes relationship links to particular channels, media, and content, and denote different arrays of relevance to a user;

storing collected data based upon the initial configuration of the plurality of fuse-nodes;

receiving an [access-request] *access request* to a plurality of fuse-nodes, wherein *the* access request is received from a social networking site;

determining an access-authorization of the received [access-request] *access request* based on a configured [privacy-setting] *privacy setting* of the plurality of fuse-nodes, wherein the [privacy-setting] *privacy setting* includes a different permission model for each of the plurality of fuse-nodes, and determining access level authorization of a requesting user;

selecting collected data of the plurality of fuse-nodes based on the determined access-authorization; and supplying and encrypting the selected collected data to the requesting user, wherein the fuse-nodes are created by:

marking each of the plurality of fuse-nodes with a corresponding identifier;

setting at least one user-selected input variable for a proprietary social recommendation algorithm to receive from and filter data for each of the plurality of [fuse nodes] *fuse-nodes*, wherein the algorithm is directed to a discovery process that is a request to show content from a collection of sources that are organized by [fuse node] *fuse-node*; and configuring the privacy setting of the plurality of fuse-nodes.

15. The non-transitory computer readable medium of claim 14, wherein each [data structure] *fuse node* in the plurality of fuse-nodes is a proprietary owned database that include links to other fuse-nodes, channels, media, and contents, which further include social network-friends and social network activities of the social network-friends.

16. The non-transitory computer readable medium of claim 14, wherein creating the plurality of fuse-nodes further comprises ranking the collected data.

17. The non-transitory computer readable medium of claim 15, wherein the algorithm uses a user-selected social trust filter that limits recommended data from a social networking site, which is selected from a group of social media sources.

* * * * *